United States Patent
Hsieh (10) Patent No.: US 9,452,669 B2
(45) Date of Patent: Sep. 27, 2016

(54) ELECTRONIC STEERING ASSISTING DEVICE OF ALL-TERRAIN VEHICLE

(71) Applicant: KWANG YANG MOTOR CO., LTD., Kaohsiung (TW)

(72) Inventor: Tsung-Ting Hsieh, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 14/658,251

(22) Filed: Mar. 16, 2015

(65) Prior Publication Data

US 2015/0274199 A1    Oct. 1, 2015

(30) Foreign Application Priority Data

Mar. 28, 2014   (TW) ............................. 103111668 A (51) Int. Cl.
| | | |
|---|---|---|
| B62D 5/04 | (2006.01) | |
| B60K 5/00 | (2006.01) | |
| B60K 11/06 | (2006.01) | |
| B60K 13/02 | (2006.01) | |
| B60K 11/04 | (2006.01) | |

(52) U.S. Cl.
CPC ................ B60K 5/00 (2013.01); B60K 11/06 (2013.01); B60K 13/02 (2013.01); B62D 5/04 (2013.01); B62D 5/0409 (2013.01); B60K 11/04 (2013.01); B60K 2005/003 (2013.01); B60Y 2200/20 (2013.01)

(58) Field of Classification Search
CPC .... B62D 5/04; B62D 5/0409; B62D 5/0421; B62D 21/183; B60K 5/00; B60K 2005/006; B60K 11/06; B60K 11/08
See application file for complete search history.

(56) References Cited

U.S. PATENT DOCUMENTS

| | | | | |
|---|---|---|---|---|
| 7,347,296 | B2 * | 3/2008 | Nakamura ............. | B60K 11/08 180/292 |
| 7,438,147 | B2 * | 10/2008 | Kato ...................... | B60K 17/34 180/68.1 |
| 7,819,220 | B2 * | 10/2010 | Sunsdahl ............. | B62D 21/183 180/312 |
| 7,900,743 | B2 * | 3/2011 | Kaku ...................... | B62D 5/04 180/444 |
| 7,958,964 | B2 * | 6/2011 | Kobayashi ............... | B62D 1/16 180/443 |
| 8,002,061 | B2 * | 8/2011 | Yamamura ............. | B60K 11/00 180/68.1 |
| 8,066,315 | B2 * | 11/2011 | Suzuki .................... | B60N 2/24 296/37.8 |
| 8,302,711 | B2 * | 11/2012 | Kinsman .............. | B60G 15/063 180/41 |
| 8,690,173 | B2 * | 4/2014 | Bilmayer ............... | B62D 3/126 280/93.514 |
| 8,863,887 | B2 * | 10/2014 | Kii ...................... | F16H 57/0489 180/339 |
| 8,973,691 | B2 * | 3/2015 | Morgan ................... | B60K 1/00 180/291 |

(Continued)

*Primary Examiner* — Emma K Frick
(74) *Attorney, Agent, or Firm* — Leong C. Lei (57) ABSTRACT

An all-terrain vehicle has a frame unit including upper side tubes and lower side tubes. Front and rear ancillary tube assemblies are connected between the upper side tubes and the lower side tubes in the front and rear parts. A power unit is fixed to the lower side tubes. A heat dissipation member for cooling the power unit is mounted to the front part of the frame unit. The power unit has an air inlet port to which a cooling duct is coupled. A steering mechanism is arranged in an internal area delimited by the upper side tubes and the lower side tubes between the heat dissipation member and the power unit and includes a steering bar, an electronic steering assisting device, and a steering arm. The cooling duct and the electronic motor are respectively set on opposite sides of a steering bar center axis of the steering mechanism.

11 Claims, 6 Drawing Sheets

(56) References Cited

U.S. PATENT DOCUMENTS

| | | | |
|---|---|---|---|
| 9,102,205 B2* | 8/2015 | Kvien | B60G 3/20 |
| 9,180,905 B2* | 11/2015 | Chae | B62D 5/0415 |
| 2010/0155170 A1* | 6/2010 | Melvin | B60K 11/08 |
| | | | 180/339 |
| 2014/0318289 A1* | 10/2014 | Tanaka | B62D 5/0409 |
| | | | 74/89.14 |
| 2015/0041237 A1* | 2/2015 | Nadeau | B60K 5/00 |
| | | | 180/292 |
| 2015/0061275 A1* | 3/2015 | Deckard | B60G 21/055 |
| | | | 280/788 |
| 2015/0259011 A1* | 9/2015 | Deckard | B62D 21/183 |
| | | | 280/781 |
| 2016/0052540 A1* | 2/2016 | Lee | B62D 5/0403 |
| | | | 180/444 |

* cited by examiner

ELECTRONIC STEERING ASSISTING DEVICE OF ALL-TERRAIN VEHICLE

TECHNICAL FIELD OF THE INVENTION

The present invention relates generally to an electronic steering assisting device of an all-terrain vehicle, and more particularly to an the electronic steering assisting device of an all-terrain vehicle that helps eliminate interference of the electronic steering assisting device with other components and makes the area below a steering bar of a steering mechanism a space of balance and compactness.

DESCRIPTION OF THE PRIOR ART

Figure 1:
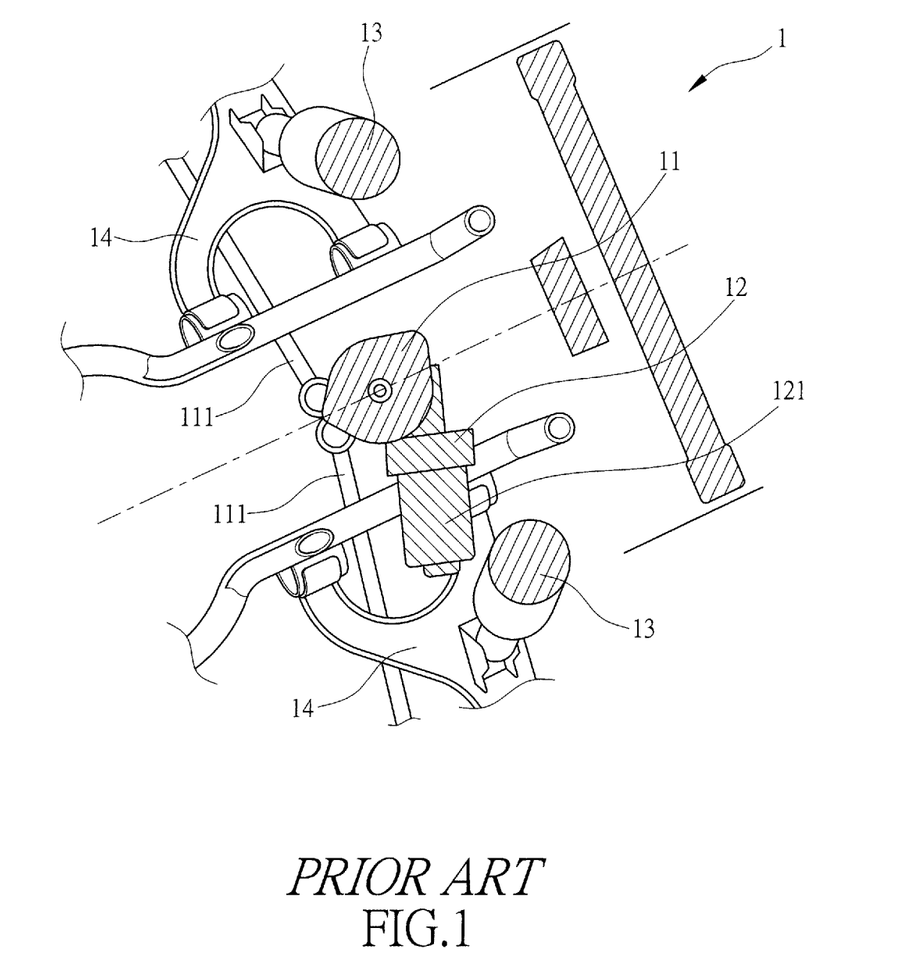
FIGS. 1 and 2 are schematic views illustrating a conventional arrangement of an electronic motor steering assisting device of an all-terrain vehicle.
Figure 2:
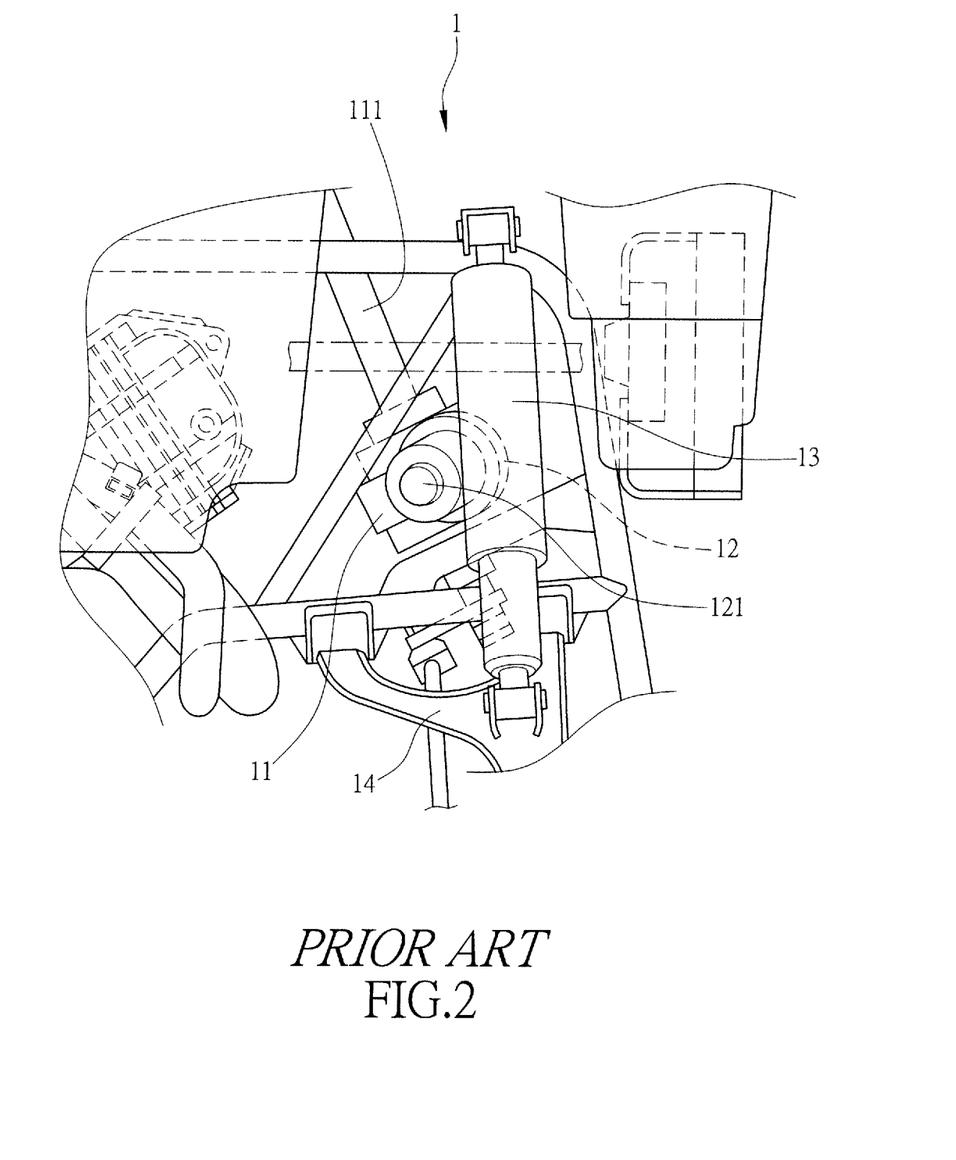

To enhance operability of steering an all-terrain vehicle 1, as shown in FIGS. 1 and 2, an electronic motor steering assisting device 12 is often mounted to a lower end of a steering bar 11. With the lower end of the steering bar 11 provided with such an electronic motor steering assisting device 12, during a steering operation of the all-terrain vehicle 1, the steering bar 11 triggers an electronic motor 121 of the electronic motor steering assisting device 12 to get into operation so that the electronic motor steering assisting device 12 uses the power generated by the electronic motor 121 to cause a steering arm 111 coupled to the steering bar 11 to operate so as to achieve an effect of making steering of the all-terrain vehicle 1 easy and effortless.

Further, referring to FIGS. 1 and 2, the electronic motor 121 of the electronic motor steering assisting device 12 is arranged in a space between a shock absorber 13 and an A-shaped arm 14. More specifically, the electronic motor 121 of the electronic motor steering assisting device 12 is mounted in a space between the shock absorber 13 and the A-shaped arm 14 in a width direction of the all-terrain vehicle 1. However, as generally known, the space between the shock absorber 13 and the A-shaped arm 14 is full of moving parts. Thus, when the electronic motor 121 of the electronic motor steering assisting device 12 is arranged in the width direction of the all-terrain vehicle 1 and located in the space between the shock absorber 13 and the A-shaped arm 14, interference with the shock absorber 13 and the A-shaped arm 14 may be readily caused. Such an arrangement is certainly disadvantageous.

Further, as shown in FIG. 2, at the location where the electronic motor 121 of the electronic motor steering assisting device 12 is mounted on the all-terrain vehicle 1, components, such as the shock absorber 13 and the A-shaped arm 14, are arranged at outer sides thereof. Thus, to maintain and repair the electronic motor steering assisting device 12, it is necessary to first remove certain components, such as the shock absorber 13 and the A-shaped arm 14. This increases the difficulty of maintenance and repairing of the electronic motor steering assisting device 12.

As described above, the known arrangement of setting the electronic motor 121 of the electronic motor steering assisting device 12 in a space between the shock absorber 13 and the A-shaped arm 14 in the width direction of the all-terrain vehicle 1 suffers the above-discussed drawbacks. Thus, it is an issue of the manufacturers of the all-terrain vehicles to provide an arrangement of electronic motor steering assisting device 12 that helps overcome the above drawbacks of the prior art.

SUMMARY OF THE INVENTION

The primary object of the present invention is to provide an electronic steering assisting device of an all-terrain vehicle, which overcomes the deficiency of a conventional all-terrain vehicle that an electronic motor of an electronic motor steering assisting device being mounted between a shock absorber and an A-shaped arm in a width direction of the vehicle between often results in interference between the electronic motor of the electronic motor steering assisting device with other components.

To achieve the above object, the technical solution adopted in the present invention is to provide an electronic steering assisting device of an all-terrain vehicle. The all-terrain vehicle comprises a frame unit that comprises a pair of left and right upper side tubes, a pair of lower side tubes arranged below the upper side tube. Front ancillary tube assemblies are connected to a front part of the upper side tubes and the lower side tubes and rear ancillary tube assemblies are arranged at a rear part of the upper side tubes and the lower side tubes. The frame unit comprises a power unit mounted thereon and the power unit is fixed to the lower side tubes and the frame unit is provided on the front part thereof with a heat dissipation member for cooling the power unit. The power unit comprises a crankcase and a transmission box, wherein the power unit comprises air inlet port and the air inlet port is coupled to a cooling duct for cooling the transmission box. A steering mechanism is arranged in an internal area delimited by the upper side tubes and the lower side tubes between the heat dissipation member and the power unit. The steering mechanism comprises a steering bar, an electronic steering assisting device, and a steering arm. The steering bar has a lower end coupled to the electronic steering assisting device and the electronic steering assisting device has a lower end coupled to the steering arm. The electronic steering assisting device comprises a main body, an electronic motor mounted beside the main body, an upper axle extending upward of the main body, and a lower axle extending downward of the main body, wherein the upper axle is coupled to the steering bar and the lower axle is coupled to the steering arm. The cooling duct is arranged to extend upward in a head direction and the electronic motor is arranged to extend downward in a direction toward a tail of the vehicle so that when viewed from the top, the cooling duct and the electronic motor are respectively set at opposites sides of a steering bar center axis of the steering mechanism.

The efficacy that the present invention may achieve with such a technical solution is that the cooling duct is arranged to extend upward in the head direction and the electronic motor is arranged to extend downward in a direction toward the tail of the vehicle, so that when viewed from the top, the cooling duct and the electronic motor are respectively set on opposite sides of the steering bar center axis of the steering mechanism to allow for full utilization of the area below the steering bar of the steering mechanism so that an effect of balanced and compact utilization of space below the steering bar of the steering mechanism can be achieved to thereby enhance the effect of use of the all-terrain vehicle.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Firstly, referring to FIGS. 3 and 4, an all-terrain vehicle A comprises a frame unit 2 that comprises a pair of left and right upper side tubes 21, a pair of lower side tubes 22 arranged below and corresponding to the upper side tubes 21, wherein the upper side tubes 21 each comprise a descending tube section 211 extending therefrom in a head direction of the vehicle (which is indicated by the phantom line arrows shown in the drawings). Lower ends of the descending tube sections 211 are connected to the lower side tubes 22 respectively. Further, a front part of the upper side tubes 21 and the lower side tubes 22 (facing the head direction) is provided with front ancillary tube assemblies 23 connecting therebetween and respectively on opposite sides thereof. Thus, a pair of left and right front ancillary tube assemblies 23 is provided. The front ancillary tube assemblies 23 each comprise an ancillary tube 231 generally in the form of an inverted L-shape and an inclined tube 232. The ancillary tube 231 has an end connected to the descending tube section 211 and an opposite end connected to the corresponding lower side tube 22. The inclined tube 232 is connected between the ancillary tube 231 and the upper side tube 21.

The frame unit 2 has a rear part (tail side of the vehicle), which is provided with rear ancillary tube assemblies 24 arranged between the upper side tubes 21 and the lower side tubes 22 and respectively on opposite sides thereof. Thus, a pair of rear ancillary tube assemblies 24 is provided. The rear ancillary tube assemblies 24 each have three connections with the upper side tube 21 comprises and the rear ancillary tube assembly 24 has two connections to the lower side tube 22.

Figure 4:
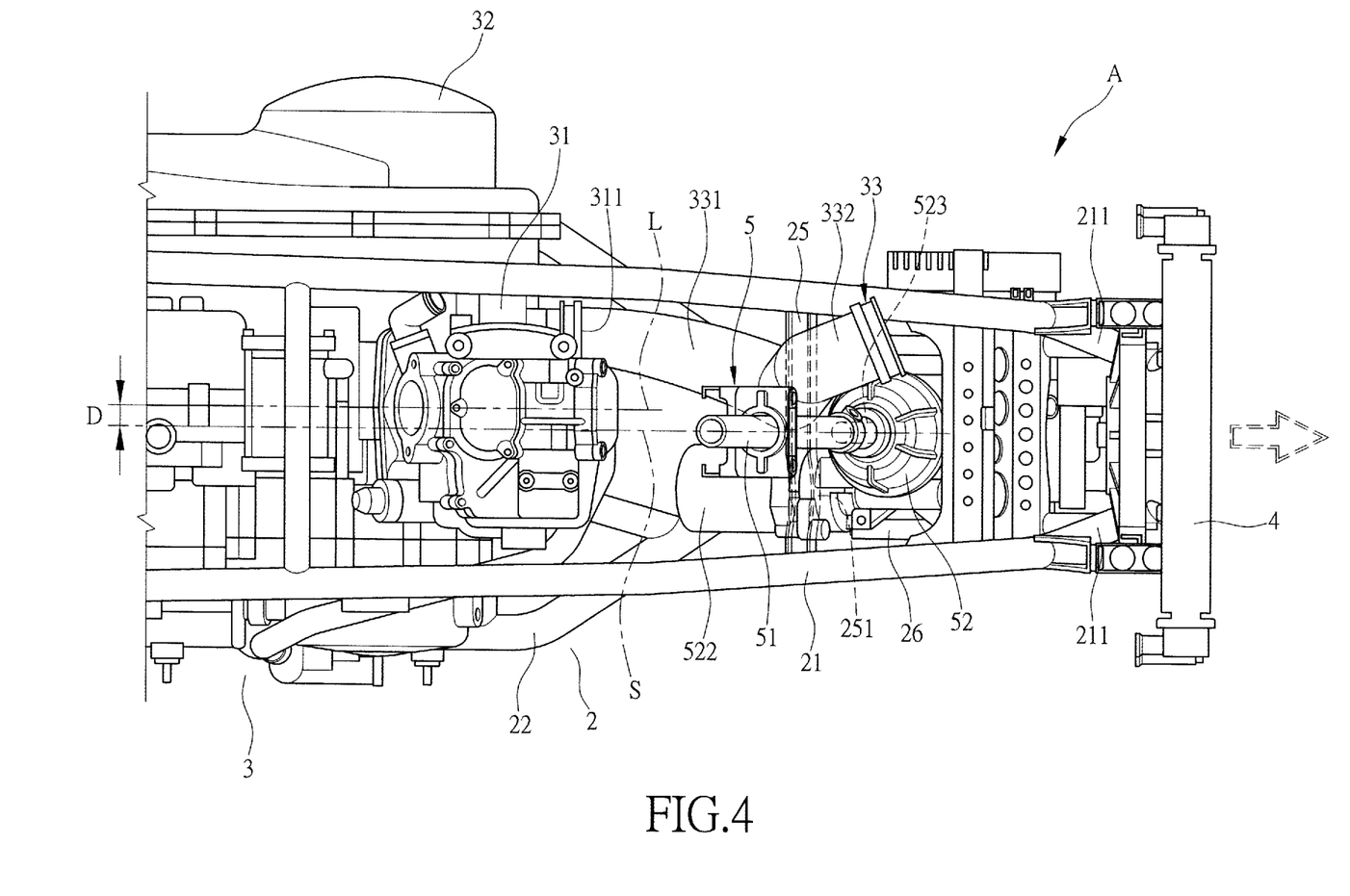
FIG. 4 is a top plan view showing the all-terrain vehicle according to the present invention.
Figure 5:
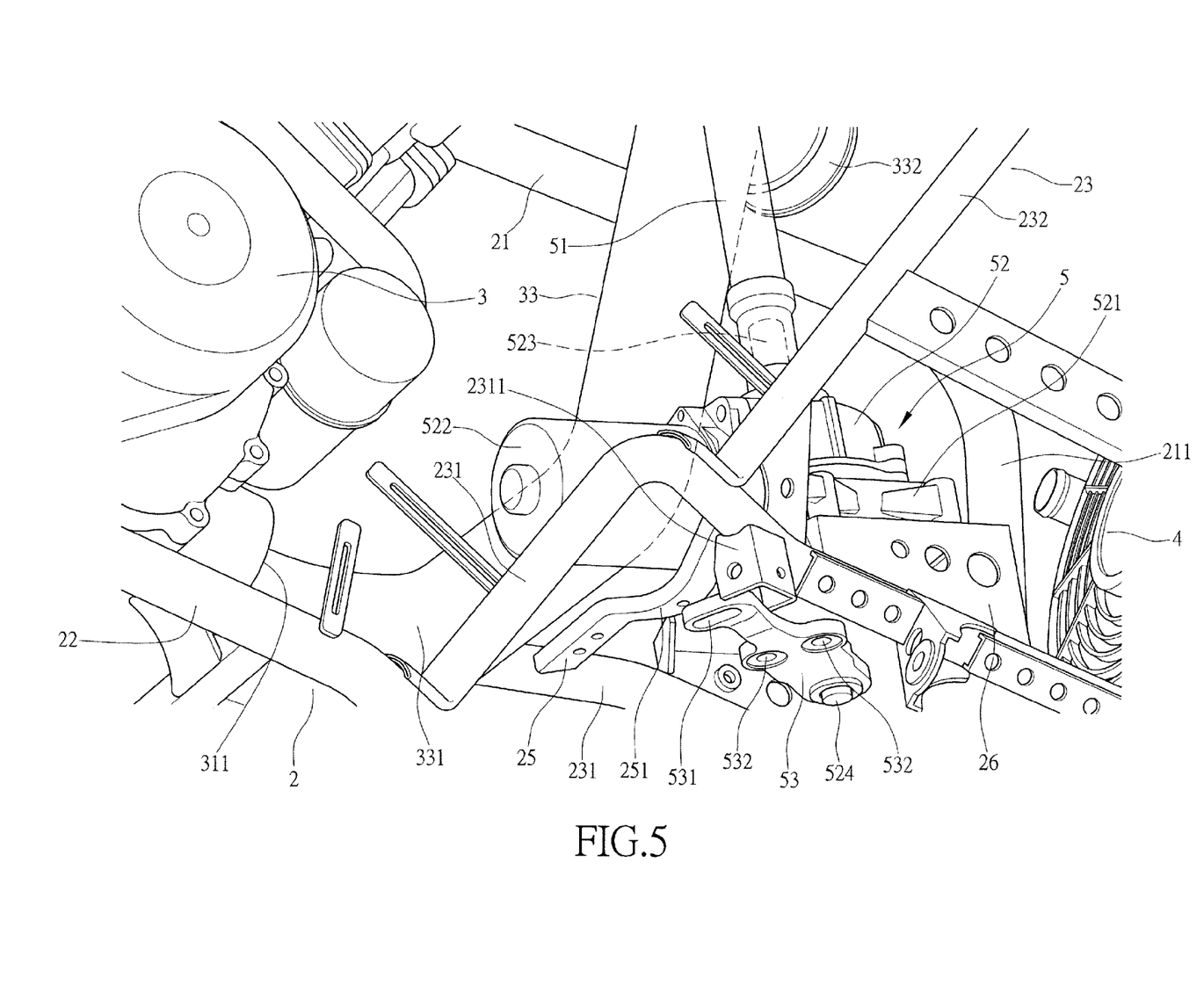
FIG. 5 is a bottom view showing the all-terrain vehicle according to the present invention.

As shown in FIGS. 4 and 5, the pair of front ancillary tube assemblies 23 are connected therebetween with a reinforcement member 25 that is horizontally arranged and a supporting seat 26. The reinforcement member 25 comprises a recess 251 in a concave form. The supporting seat 26 receives an electronic steering assisting device 52 of a steering mechanism 5 to mount thereon.

Figure 3:
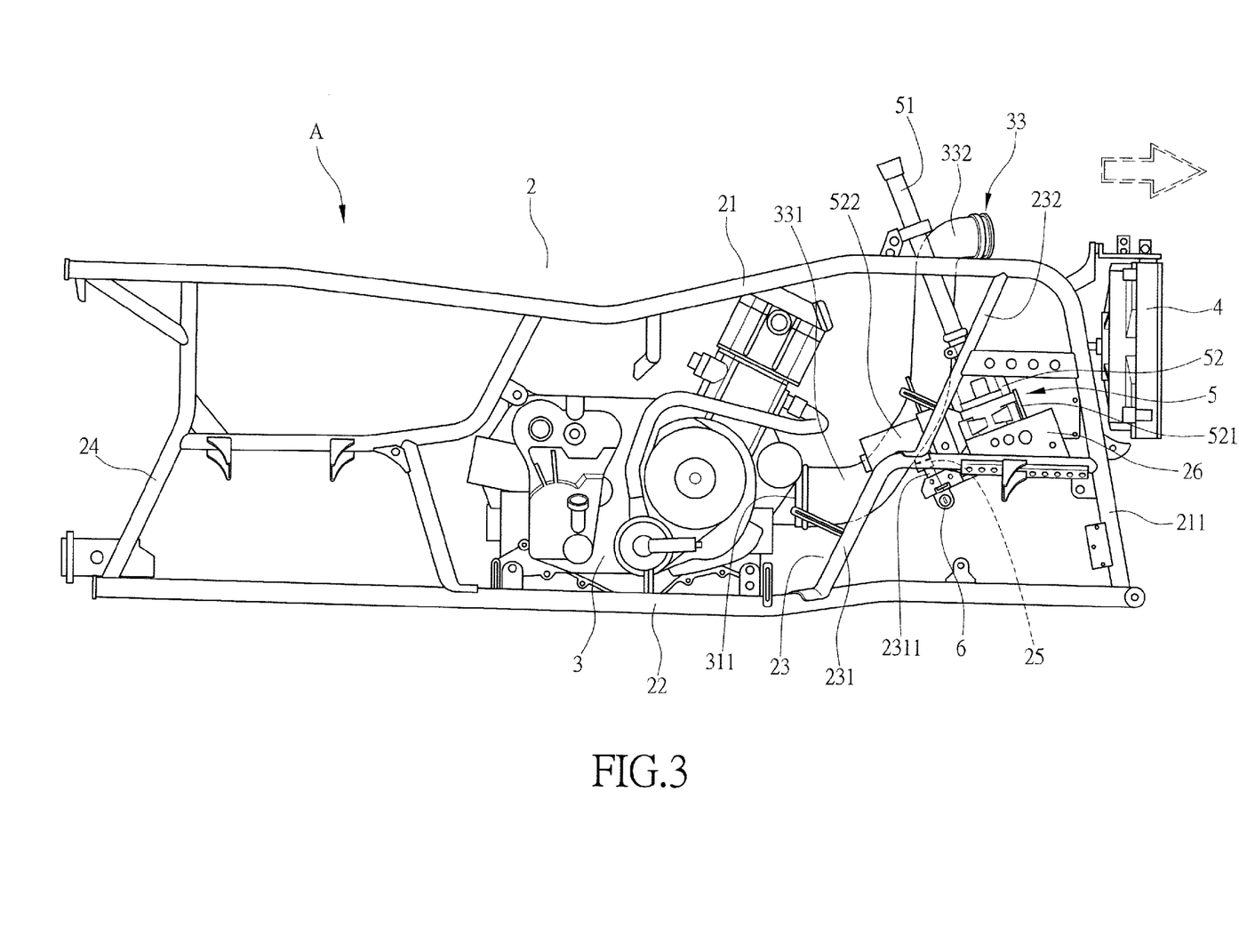
FIG. 3 is a side elevational view showing an all-terrain vehicle according to the present invention.

As shown in FIGS. 3 and 4, the frame unit 2 comprises a power unit 3 mounted thereto at a location adjacent to a center thereof. The power unit 3 is fixed to the lower side tubes 22. Further, the front part of the frame unit 2 (facing the head direction) is provided with a heat dissipation member 4 for cooling the power unit 3. The power unit 3 comprises a crankcase 31 and a transmission box 32. The power unit 3 is provided with an air inlet port 311 leftward of a cylinder axis L (namely the left side of a rider sitting on the vehicle) thereof. The air inlet port 311 is coupled to a cooling duct 33 for cooling the transmission box 32. Specifically speaking, the air inlet port 311 is arranged in front of the left side of the crankcase 31 of the power unit 3. The cooling duct 33 extends upward from the left side of the crankcase 31 in a direction toward the front of the vehicle (the head direction). The cooling duct 33 comprises an extension section 331 and a rising section 332. The rising section 332 of the cooling duct 33 has an end connected to an intake box (not shown in the drawings), whereby external air is drawn through the intake box into the rising section 332 of the cooling duct 33 and subsequently conducted by the extension section 331 to get into the air inlet port 311. The external air moves from the air inlet port 311 through the crankcase 31 into the transmission box 32 to perform a cooling operation. Further, the rising section 332 of the cooling duct 33 is extended upward to project beyond the upper side tubes 21 in order to prevent external water from flowing through the cooling duct 33 into the transmission box 32.

As shown in FIGS. 3 and 4, an interior area is delimited by the upper side tubes 21 and the lower side tubes 22 between the heat dissipation member 4 and the power unit 3 to receive a steering mechanism 5 arranged therein, where the supporting seat 26 is arranged to receive the steering mechanism 5 to be mounted thereon. The steering mechanism 5 comprises a steering bar 51, an electronic steering assisting device 52, and a steering arm 53, wherein the steering bar 51 has a lower end coupled to the electronic steering assisting device 52 and the electronic steering assisting device 52 has a lower end coupled to the steering arm 53. The steering arm 53 comprises a lock hole 531 and two connection holes 532, wherein the two connection holes 532 are provided for connection with a steering tie rod (not shown in the drawings). The steering tie rod is coupled to a wheel (not shown in the drawings).

As shown in FIG. 4, the steering mechanism 5 is arranged in the internal area delimited by the upper side tubes 21 and the lower side tubes 22 between the heat dissipation member 4 and the power unit 3, wherein the cylinder axis L of the power unit 3 is arranged to shift leftward from a steering bar center axis S, namely the steering bar center axis S and the cylinder axis L of the power unit 3 comprise a spacing distance D therebetween. With the steering bar center axis S and the cylinder axis L of the power unit 3 being shifted away from each other, more flexibility is achieved for arranging the cooling duct 33 that extends upwards from the left side of the crankcase 31 in a direction toward the front of the vehicle.

Figure 6:
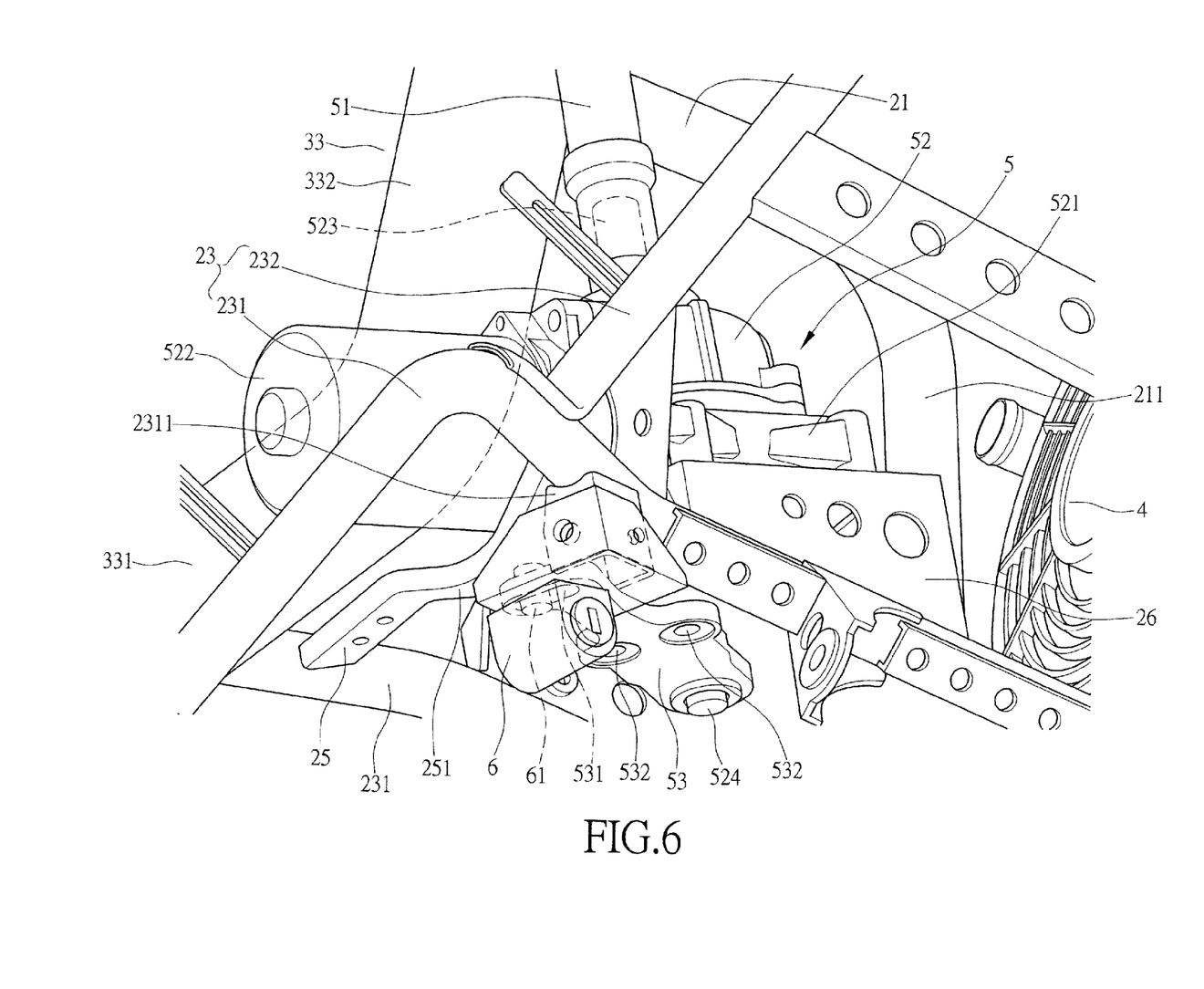
FIG. 6 is a schematic view showing a lock assembly of the all-terrain vehicle of the present invention.

As shown in FIGS. 4, 5, and 6, the electronic steering assisting device 52 of the steering mechanism 5 is mounted on the supporting seat 26 of the frame unit 2. The electronic steering assisting device 52 comprises a main body 521, the electronic motor 522 mounted beside the main body 521, an upper axle 523 extending upward of the main body 521, and a lower axle 524 extending downward of the main body 521, wherein the upper axle 523 is provided for coupling with the steering bar 51 with an upper end of the steering bar 51 connected to a steering handlebar (not shown in the drawings) and the lower axle 524 is coupled to the steering arm 53. As such, when a rider operates the steering handlebar, the steering bar 51 drives the upper axle 523 and the lower axle 524 of the electronic steering assisting device 52, wherein the electronic steering assisting device 52, in response to an angular difference so induced between the upper axle 523 and the lower axle 524, drives the electronic motor 522 to operate in such a way that the electronic motor 522 causes the lower axle 524 to rotate so as to have rotation angles of the lower axle 524 and the upper axle 523 match each other, whereby the lower axle 524 causes the steering arm 53 to operate for assisting and completing a steering operation of the all-terrain vehicle A.

As shown in FIGS. 3, 4, 5, and 6, the electronic motor 522 of the electronic steering assisting device 52 is arranged generally longitudinally in a front-rear direction of the all-terrain vehicle A and located beside the steering bar 51. Specifically speaking, the electronic motor 522 is arranged to extend from a side of the main body 521 of the electronic steering assisting device 52 in a direction toward the vehicle rear side (namely in a direction toward the power unit 3) and also extending downwardly. Further, the electronic motor 522 is arranged above the reinforcement member 25 between the ancillary tubes 231. More precisely speaking, the electronic motor 522 extends above the recess 251 of the reinforcement member 25 so that with the arrangement of recess 251, the reinforcement member 25 allows the electronic motor 522 to extend rearward and downward without interference.

As shown in FIGS. 3 and 4, in an embodiment of the present invention, when viewed from the top, the cooling duct 33 and the electronic motor 522 are respectively set at opposite sides of the steering bar center axis S of the steering mechanism 5. In other words, the cooling duct 33 that extends from the power unit 3 in the head direction is arranged at the left side of the steering bar center axis S of the steering mechanism 5 (the left side of the vehicle when viewed from the top); and the electronic motor 522 of the electronic steering assisting device 52 that extends toward the vehicle tail is arranged at the right side of the steering bar center axis S of the steering mechanism 5 (the left side of the vehicle when viewed from the top), as such the internal area delimited by the upper side tubes 21 and the lower side tubes 22 and the steering bar 51 between the heat dissipation member 4 and the power unit 3 can be fully used. When viewed from a side of the all-terrain vehicle A so structured, the electronic motor 522 and the extension section 331 of the cooling duct 33 are arranged in an overlapping condition so that an area below the steering bar 51 of the steering mechanism 5 can be fully used so that the area below the steering bar 51 of the steering mechanism 5 achieves an effect of balanced and compact utilization of space.

As shown in FIGS. 3, 5, and 6, the present invention further provides a coupling member 2311 extending downward from the ancillary tube 231 of the front ancillary tube assembly 23. The coupling member 2311 comprises a lock assembly 6 mounted thereto and with the lock hole 531, which is of an elongate configuration, being formed in an end of the steering arm 53, a lock bolt 61 of the lock assembly 6 is insertable into the lock hole 531 of the steering arm 53 to constrain rotation of the steering arm 53 so as to achieve an effect of burglary resistance for the all-terrain vehicle A.

The efficacy of the present invention is that the cooling duct 33 is arranged to extend upward from the power unit 3 in the head direction and the electronic motor 522 of the electronic steering mechanism 52 is arranged to extend downward in a direction toward the vehicle tail such that when viewed from the top, the cooling duct 33 and the electronic motor 522 are respectively set at opposite sides of the steering bar center axis S of the steering mechanism 5. As such, an internal space delimited by the upper side tubes 21 and the lower side tubes 22 between the heat dissipation member 4 and the power unit 3 can be fully used and the area below the steering bar 51 of the steering mechanism 5 can be fully used so that an effect of balanced and compact utilization of space below the steering bar 51 of the steering mechanism 5 can be achieved to thereby enhance the effect of use of the all-terrain vehicle A.

Another efficacy of the present invention is that the ancillary tube 231 is provided with the coupling member 2311 and the coupling member 2311 comprises the lock assembly 6 mounted thereto and the steering arm 53 comprises the lock hole 531 formed in the end thereof so that the lock bolt 61 of the lock assembly 6 is insertable into the lock hole 531 of the steering arm 53 to constrain the rotation of the steering arm 53. When the steering arm 53 is so constrained, the wheel of the all-terrain vehicle A is prevented from being steered by which an effect of burglary resistance can be achieved for the all-terrain vehicle A.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An electronic steering assisting device of an all-terrain vehicle, wherein the all-terrain vehicle comprises a frame unit that comprises a pair of left and right upper side tubes, a pair of lower side tubes arranged below the upper side tube; front ancillary tube assemblies are connected to a front part of the upper side tubes and the lower side tubes and rear ancillary tube assemblies are arranged at a rear part of the upper side tubes and the lower side tubes; the frame unit comprises a power unit mounted thereon and the power unit is fixed to the lower side tubes and the frame unit is provided on the front part thereof with a heat dissipation member for cooling the power unit; the power unit comprises a crankcase and a transmission box, wherein the power unit comprises air inlet port and the air inlet port is coupled to a cooling duct for cooling the transmission box; a steering mechanism is arranged in an internal area delimited by the upper side tubes and the lower side tubes between the heat dissipation member and the power unit; and the steering mechanism comprises a steering bar, an electronic steering assisting device, and a steering arm;

characterized in that the steering bar has a lower end coupled to the electronic steering assisting device and the electronic steering assisting device has a lower end coupled to the steering arm; the electronic steering assisting device comprises a main body, an electronic motor mounted beside the main body, an upper axle extending upward of the main body, and a lower axle extending downward of the main body, wherein the upper axle is coupled to the steering bar and the lower axle is coupled to the steering arm; the cooling duct is arranged to extend upward in a forward direction of the vehicle and the electronic motor is arranged to extend downward in a direction toward a rear of the vehicle so that when viewed from the top, the cooling duct and the electronic motor are respectively set at opposites sides of a steering bar center axis of the steering mechanism.

2. The electronic steering assisting device of the all-terrain vehicle as claimed in claim 1, wherein the air inlet port is arranged on a left side of a cylinder axis of the power unit and the air inlet port is arranged in front of a left side of the crankcase of the power unit; and external air is drawn through the cooling duct into the air inlet port and subsequently through the crankcase into the transmission box.

3. The electronic steering assisting device of the all-terrain vehicle as claimed in claim 1, wherein a pair of left and right front ancillary tube assemblies is provided and the front ancillary tube assemblies each comprise an ancillary tube in the form of an inverted L shape and an inclined tube, the ancillary tube having an end connected to a descending tube section and an opposite end connected to the lower side tube, the inclined tube connected between the ancillary tube and the upper side tube.

4. The electronic steering assisting device of the all-terrain vehicle as claimed in claim 3, wherein the front ancillary tube assemblies comprise ancillary tubes, the ancillary tubes comprising a supporting seat connected therebetween, the supporting seat receiving the electronic steering assisting device of the steering mechanism to be mounted thereon.

5. The electronic steering assisting device of the all-terrain vehicle as claimed in claim 1, wherein the front ancillary tube assemblies comprise ancillary tubes, the ancillary tubes comprising a supporting seat connected therebetween, the supporting seat receiving the electronic steering assisting device of the steering mechanism to be mounted thereon.

6. The electronic steering assisting device of the all-terrain vehicle as claimed in claim 1, wherein viewed from the top, the electronic motor is arranged at a right side of the steering bar center axis and the upper side tube and the cooling duct is arranged at a left side of the steering bar center axis and the upper side tube.

7. The electronic steering assisting device of the all-terrain vehicle as claimed in claim 1, wherein the power unit has a cylinder axis that is shifted leftward with respect to the steering bar center axis.

8. The electronic steering assisting device of the all-terrain vehicle as claimed in claim 1, wherein the front ancillary tube assemblies comprise a reinforcement member connected therebetween, the reinforcement member comprising a recess, the electronic motor of the electronic steering assisting device being arranged to extend above the recess of the reinforcement member.

9. The electronic steering assisting device of the all-terrain vehicle as claimed in claim 1, wherein the front ancillary tube assemblies comprise a coupling member, the coupling member comprising a lock assembly mounted thereto, the steering arm having an end in which a lock hole is formed, the lock assembly comprising a lock bolt, which is extendable into the lock hole of the steering arm.

10. The electronic steering assisting device of the all-terrain vehicle as claimed in claim 1, wherein the cooling duct comprises an extension section and a rising section, whereby when viewed from a side of the all-terrain vehicle, the electronic motor and the extension section of the cooling duct are arranged in an overlapping condition.

11. The electronic steering assisting device of the all-terrain vehicle as claimed in claim 10, wherein the rising section extends upward and projects beyond the upper side tubes.

* * * * *